US009049641B2

(12) United States Patent
Wible et al.

(10) Patent No.: US 9,049,641 B2
(45) Date of Patent: Jun. 2, 2015

(54) APPARATUS AND METHOD FOR RADIO FREQUENCY SILENCING IN OIL AND GAS OPERATIONS, EXCAVATION SITES, AND OTHER ENVIRONMENTS

(75) Inventors: Jason A. Wible, Plano, TX (US); Brandon C. Taylor, Frisco, TX (US); James S. MacLean, III, Coppell, TX (US)

(73) Assignee: GEOFORCE, INC., Lewisville, TX (US)

( * ) Notice: Subject to any disclaimer, the term of this patent is extended or adjusted under 35 U.S.C. 154(b) by 0 days.

(21) Appl. No.: 13/443,097

(22) Filed: Apr. 10, 2012

(65) Prior Publication Data

US 2013/0267247 A1    Oct. 10, 2013

(51) Int. Cl.
*H04W 24/00* (2009.01)
*H04W 48/04* (2009.01)
*H04W 52/02* (2009.01)

(52) U.S. Cl.
CPC .......... *H04W 48/04* (2013.01); *H04W 52/0229* (2013.01); *H04W 52/0235* (2013.01)

(58) Field of Classification Search
CPC ........... H04W 4/02; H04W 4/04; H04W 8/16; H04W 48/02; H04W 48/04; H04W 64/00; H04W 48/08
USPC ...................................................... 455/456.4
See application file for complete search history.

(56) References Cited

U.S. PATENT DOCUMENTS

| | | | |
|---|---|---|---|
| 3,573,817 A | 4/1971 | Akers | |
| 4,977,577 A | 12/1990 | Arthur et al. | |
| 5,151,684 A | 9/1992 | Johnsen | |
| 5,380,994 A | 1/1995 | Ray | |
| 5,386,084 A | 1/1995 | Risko | |
| 5,479,441 A | 12/1995 | Tymes et al. | |
| 5,668,803 A | 9/1997 | Tymes et al. | |
| 5,686,888 A | 11/1997 | Welles, II et al. | |
| 5,774,876 A | 6/1998 | Woolley et al. | |
| 5,835,377 A | 11/1998 | Bush | |
| 5,920,589 A | 7/1999 | Rouquette et al. | |
| 5,987,058 A | 11/1999 | Sanderford et al. | |

(Continued)

FOREIGN PATENT DOCUMENTS

WO    WO 2011038018 A1    3/2011

OTHER PUBLICATIONS

"Globalstar MMT Wireless Tracker", www.globalstar.com, 2010, 1 page.

(Continued)

*Primary Examiner* — Khalid Shaheed
*Assistant Examiner* — Shantell L Heiber

(57) ABSTRACT

A method includes receiving a silence command at a location tracking device, where the silence command instructs the location tracking device to stop wireless transmissions. The method also includes stopping wireless transmissions from the location tracking device for a specified period of time in response to the silence command. The method further includes automatically resuming wireless transmissions from the location tracking device after the specified period of time has elapsed. A length of the specified period of time can be defined by the silence command. A request to identify the location tracking device can be received at the location tracking device, and a response identifying the location tracking device can be transmitted prior to receiving the silence command.

24 Claims, 6 Drawing Sheets

(56) References Cited

U.S. PATENT DOCUMENTS

| | | | |
|---|---|---|---|
| 5,999,561 | A | 12/1999 | Naden et al. |
| 6,216,087 | B1 | 4/2001 | Want et al. |
| 6,292,108 | B1 | 9/2001 | Straser et al. |
| 6,639,939 | B1 | 10/2003 | Naden et al. |
| 6,830,181 | B1 | 12/2004 | Bennett |
| 6,847,892 | B2 | 1/2005 | Zhou et al. |
| 6,851,611 | B1 | 2/2005 | Shaw-Sinclair |
| 6,965,314 | B2 | 11/2005 | Bohinc, Jr. |
| 6,974,078 | B1 | 12/2005 | Simon |
| 7,009,530 | B2 | 3/2006 | Zigdon et al. |
| 7,040,532 | B1 | 5/2006 | Taylor et al. |
| 7,072,320 | B2 | 7/2006 | Filho |
| 7,098,784 | B2 | 8/2006 | Easley et al. |
| 7,099,770 | B2 | 8/2006 | Naden et al. |
| 7,187,278 | B2 | 3/2007 | Biffar |
| 7,190,265 | B1 | 3/2007 | Bohinc, Jr. |
| 7,262,685 | B2 | 8/2007 | Bastian, II |
| 7,315,281 | B2 | 1/2008 | Dejanovic et al. |
| 7,327,262 | B2 | 2/2008 | Motteram et al. |
| 7,337,061 | B2 | 2/2008 | Naden et al. |
| 7,384,380 | B2 | 6/2008 | Reinbold et al. |
| 7,405,655 | B2 | 7/2008 | Ng et al. |
| 7,477,694 | B2 | 1/2009 | Sanderford, Jr. et al. |
| 7,558,312 | B2 | 7/2009 | Cheng et al. |
| 7,593,456 | B2 | 9/2009 | Sailaja et al. |
| 7,620,098 | B2 | 11/2009 | Hong et al. |
| 7,623,029 | B2 | 11/2009 | Meyers |
| 7,672,781 | B2 | 3/2010 | Churchill et al. |
| 7,683,270 | B2 | 3/2010 | Fernandez et al. |
| 7,693,530 | B1 * | 4/2010 | McKinney et al. ............ 455/510 |
| 7,705,777 | B2 | 4/2010 | Sanderford, Jr. et al. |
| 7,895,131 | B2 | 2/2011 | Kraft |
| 7,928,844 | B2 * | 4/2011 | Mackenzie et al. ......... 340/572.1 |
| 7,932,827 | B2 | 4/2011 | Chand et al. |
| 7,978,065 | B2 | 7/2011 | Schnitz et al. |
| 7,994,917 | B2 | 8/2011 | Hirota et al. |
| 8,004,387 | B2 | 8/2011 | Childress et al. |
| 8,004,397 | B2 | 8/2011 | Forrest et al. |
| 8,014,439 | B2 | 9/2011 | Sakamoto et al. |
| 8,126,680 | B2 | 2/2012 | Troxler et al. |
| 8,159,329 | B1 | 4/2012 | Killian et al. |
| 8,223,009 | B2 | 7/2012 | Anderson et al. |
| 8,237,575 | B2 | 8/2012 | MacLean, III et al. |
| 8,239,169 | B2 | 8/2012 | Gregory et al. |
| 8,837,447 | B2 | 9/2014 | Twitchell, Jr. |
| 2002/0038267 | A1 | 3/2002 | Can et al. |
| 2003/0087631 | A1 * | 5/2003 | Diachina et al. ............... 455/414 |
| 2003/0149526 | A1 | 8/2003 | Zhou et al. |
| 2004/0124977 | A1 | 7/2004 | Biffar |
| 2004/0147220 | A1 | 7/2004 | Vaddiparty et al. |
| 2004/0157597 | A1 * | 8/2004 | Comer et al. ............... 455/426.1 |
| 2004/0212499 | A1 | 10/2004 | Bohinc, Jr. |
| 2005/0113107 | A1 | 5/2005 | Meunier |
| 2005/0140498 | A1 | 6/2005 | Bastian, II |
| 2005/0171696 | A1 | 8/2005 | Naden et al. |
| 2005/0250440 | A1 | 11/2005 | Zhou et al. |
| 2006/0007006 | A1 | 1/2006 | Alioto et al. |
| 2006/0011716 | A1 | 1/2006 | Perkowski |
| 2006/0059964 | A1 | 3/2006 | Bass et al. |
| 2006/0113370 | A1 | 6/2006 | Taylor et al. |
| 2006/0113374 | A1 | 6/2006 | Taylor et al. |
| 2006/0221363 | A1 | 10/2006 | Roth et al. |
| 2007/0222595 | A1 | 9/2007 | Motteram et al. |
| 2008/0001748 | A1 | 1/2008 | Childress et al. |
| 2008/0030330 | A1 | 2/2008 | Vock et al. |
| 2008/0042842 | A1 | 2/2008 | Ulibarri |
| 2008/0051033 | A1 * | 2/2008 | Hymes ............................ 455/47 |
| 2008/0186166 | A1 | 8/2008 | Zhou et al. |
| 2008/0198905 | A1 | 8/2008 | Zhu et al. |
| 2008/0221930 | A1 | 9/2008 | Wekell et al. |
| 2008/0266131 | A1 | 10/2008 | Richardson et al. |
| 2009/0051490 | A1 | 2/2009 | Childress et al. |
| 2009/0109040 | A1 | 4/2009 | MacLean, III et al. |
| 2009/0117880 | A1 * | 5/2009 | Sipher ........................ 455/412.2 |
| 2009/0322510 | A1 | 12/2009 | Berger et al. |
| 2010/0016022 | A1 | 1/2010 | Liu et al. |
| 2010/0038417 | A1 | 2/2010 | Blankitny |
| 2010/0137148 | A1 | 6/2010 | Kaye |
| 2010/0151955 | A1 | 6/2010 | Holden |
| 2010/0171611 | A1 | 7/2010 | Gao et al. |
| 2010/0224783 | A1 | 9/2010 | Frank |
| 2010/0258618 | A1 | 10/2010 | Philbrick et al. |
| 2010/0312833 | A1 | 12/2010 | Rimmer et al. |
| 2010/0314456 | A1 | 12/2010 | Hartwig et al. |
| 2011/0004444 | A1 | 1/2011 | Farrow et al. |
| 2011/0017693 | A1 | 1/2011 | Thomas et al. |
| 2011/0018418 | A1 | 1/2011 | Yoo |
| 2011/0050424 | A1 | 3/2011 | Cova et al. |
| 2011/0066398 | A1 | 3/2011 | Troxler et al. |
| 2011/0074629 | A1 | 3/2011 | Khan et al. |
| 2011/0079652 | A1 | 4/2011 | Bass et al. |
| 2011/0112979 | A1 | 5/2011 | Holsen et al. |
| 2011/0155920 | A1 | 6/2011 | Hupont et al. |
| 2012/0037697 | A1 | 2/2012 | Boone et al. |
| 2012/0084182 | A1 | 4/2012 | Bass et al. |
| 2012/0087355 | A1 * | 4/2012 | Wentink ........................ 370/338 |

OTHER PUBLICATIONS

"Globalstar SMARTTONE Satellite Managed Asset Ready Tracker", www.globalstar.com, 2010, 1 page.

"SmartOne LP, Satellite-Manged Asset-Ready Tracker", www.globalstar.com, 2011, 2 pages.

Jason A. Wible, et al., "Location Tracking With Integrated Identification of Cargo Carrier Contents and Related System and Method", U.S. Appl. No. 13/443,841, filed Apr. 10, 2012.

Brandon C. Taylor, et al., "System and Method for Remote Cargo Tracking", U.S. Appl. No. 13/443,201, filed Apr. 10, 2012.

Brandon C. Taylor, et al., "System and Method for Remote Equipment Data Management", U.S. Appl. No. 13/443,118, filed Apr. 10, 2012.

U.S. Office Action dated Mar. 26, 2014 in connection with U.S. Appl. No. 13/443,118; 17 pages.

Office Action dated Oct. 6, 2010 in connection with U.S. Appl. No. 12/288,909.

Office Action dated Feb. 7, 2011 in connection with U.S. Appl. No. 12/288,909.

Office Action dated Jun. 10, 2011 in connection with U.S. Appl. No. 12/288,909.

Office Action dated Sep. 20, 2012 in connection with U.S. Appl. No. 13/479,005.

Office Action dated Mar. 7, 2013 in connection with U.S. Appl. No. 13/479,005.

Office Action dated Sep. 20, 2013 in connection with U.S. Appl. No. 13/443,819.

Office Action dated Jan. 30, 2014 in connection with U.S. Appl. No. 13/443,819.

Office Action dated May 22, 2014 in connection with U.S. Appl. No. 13/443,841.

Office Action dated May 28, 2014 in connection with U.S. Appl. No. 13/443,819.

Office Action dated Jul. 18, 2014 in connection with U.S. Appl. No. 13/443,118.

Office Action dated Sep. 6, 2013 in connection with U.S. Appl. No. 13/443,118.

Office Action dated Oct. 11, 2013 in connection with U.S. Appl. No. 13/443,841.

U.S. Office Action dated Nov. 13, 2014 in connection with U.S. Appl. No. 13/443,841; 28 pp.

Office Action dated Oct. 1, 2014 in connection with U.S. Appl. No. 13/443,819; 23 pp.

U.S. Office Action dated Jan. 23, 2015 in connection with U.S. Appl. No. 13/443,201; 19 pages.

U.S. Office Action dated Mar. 5, 2015 in connection with U.S. Appl. No. 13/443,118; 20 pages.

* cited by examiner

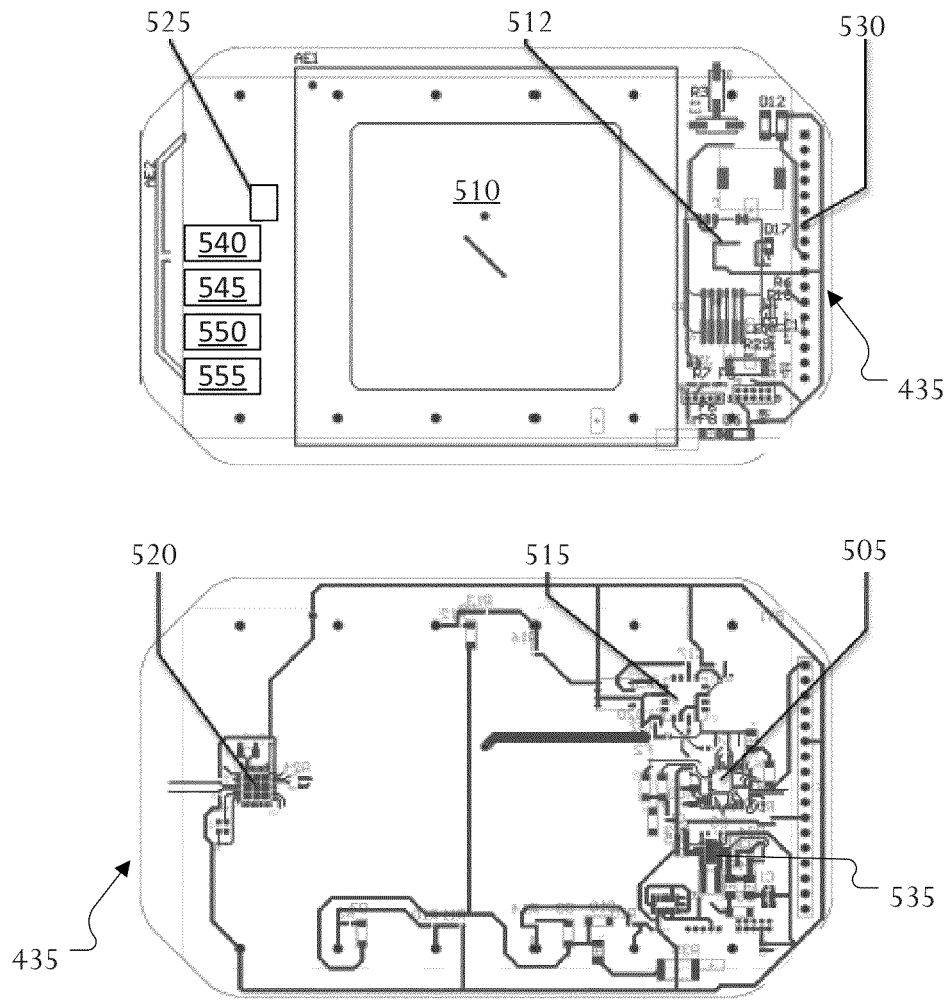
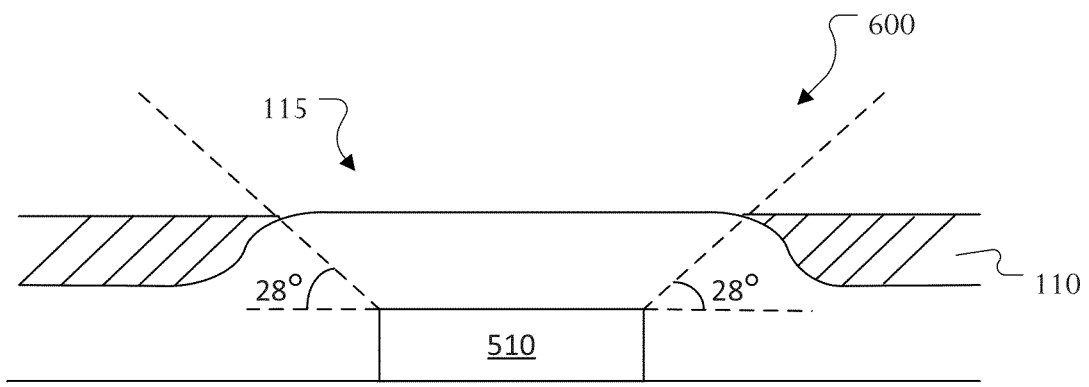
FIG. 6

APPARATUS AND METHOD FOR RADIO FREQUENCY SILENCING IN OIL AND GAS OPERATIONS, EXCAVATION SITES, AND OTHER ENVIRONMENTS

TECHNICAL FIELD

This disclosure relates generally to asset tracking systems. More specifically, this disclosure relates to an apparatus and method for radio frequency silencing in oil and gas operations, excavation sites, and other environments.

BACKGROUND

GPS tracking devices are increasingly used throughout various industries, such as the oil and gas industry, to locate or remotely monitor field equipment. The benefits of this technology include improved operational efficiency, increased utilization, improved service quality, and enhanced maintenance practices. GPS tracking devices typically utilize wireless backhaul data links for sending data to a remote monitoring or control facility. The wireless links often include communication links over cellular communication networks, satellite communication networks, or local WiFi communication networks.

SUMMARY

This disclosure provides an apparatus and method for radio frequency silencing in oil and gas operations, excavation sites, and other environments.

In a first embodiment, a method includes receiving a silence command at a location tracking device, where the silence command instructs the location tracking device to stop wireless transmissions. The method also includes stopping wireless transmissions from the location tracking device for a specified period of time in response to the silence command. The method further includes automatically resuming wireless transmissions from the location tracking device after the specified period of time has elapsed.

In a second embodiment, an apparatus includes a location tracking device configured to be associated with an asset. The location tracking device is configured to track a location of the location tracking device to thereby track a location of the asset. The location tracking device includes at least one wireless transceiver configured to communicate wirelessly and a control unit. The control unit is configured to receive via at least one wireless transceiver a silence command instructing the location tracking device to stop wireless transmissions. The control unit is also configured to stop wireless transmissions from at least one wireless transceiver for a specified period of time in response to the silence command. The control unit is further configured to automatically resume wireless transmissions by the at least one wireless transceiver after the specified period of time has elapsed.

In a third embodiment, a method includes identifying one or more location tracking devices in a specified area. The method also includes initiating transmission of a silence command to the one or more location tracking devices. The silence command instructs the one or more location tracking devices to stop wireless transmissions for a specified period of time before automatically resuming wireless transmissions. The silence command identifies a length of the specified period of time.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of this disclosure, reference is now made to the following description, taken in conjunction with the accompanying drawings, in which:

FIG. 5 illustrates an example circuit board in the global tracking device according to this disclosure;

FIG. 6 illustrates an example signal focusing configuration of the global tracking device according to this disclosure;

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
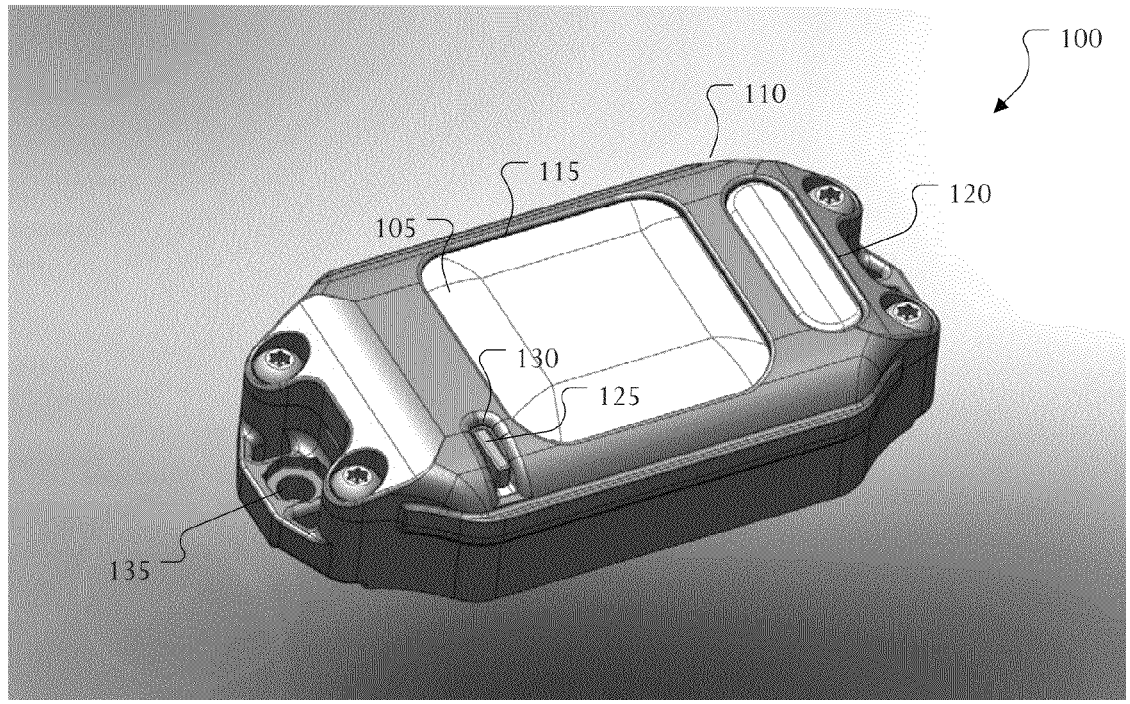
FIG. 1 illustrates an example global tracking device according to this disclosure.

FIG. 1 illustrates an example global tracking device (GTD) 100 according to this disclosure. As shown in FIG. 1, the GTD 100 includes a control unit 105 and a hardened case 110. The hardened case 110 is configured to protect the control unit 105 during deployment in the field. The hardened case 110 can be formed from any suitable material(s), such as a zinc alloy, steel, or other suitable material. In some embodiments, the material used to form the hardened case 110 is anti-magnetic and/or non-sparking. The hardened case 110 inhibits damage to the control unit 105, such as by helping to prevent damage from compression, impact, and weather. As a specific example, the hardened case 110 can prevent water or other liquids from contacting or entering into the control unit 105. In some embodiments, the GTD 100 includes at least two layers of seals configured to protect processing circuitry and a power source contained within the control unit 105.

In this example, the hardened case 110 includes a first window 115 configured to allow transmission of wireless signals to and from the control unit 105. The wireless signals can include long-range RF signals, such as cellular wireless signals or satellite communication signals. The first window 115 is also configured to protect the control unit 105 from electro-static interference (ESI). In this example, the first window 115 is dimensioned to enable part of the control unit 105 to extend into the first window 115. In some embodiments, the portion of the control unit 105 that extends into the first window 115 can extend beyond a planar level of a surface of the hardened case 110. In addition, the first window 115 can be dimensioned to help focus wireless signals towards a transceiver in the control unit 105. For example, the first window 115 can be dimensioned so that a metal edge of the first window 115 is disposed at a specified angle in relation to a location of the transceiver. In some embodiments, the metal edge of the first window 115 is disposed at an angle of about 28° from the transceiver.

The hardened case 110 also includes a second window 120 configured to allow transmission of local wireless signals to and from the control unit 105. The local wireless signals can include BLUETOOTH LOW ENERGY (BLE), WiFi, ZIGBEE, Radio Frequency identification (RFID), or other signals. The second window 120 also protects the control unit 105 from ESI. In this example, the second window 120 is dimensioned to enable part of the control unit 105 to extend into the second window 120. In some embodiments, the portion of the control unit 105 that extends into the second window 120 can extend beyond a planar level of a surface of the hardened case 110.

The GTD 100 further includes a switch 125 that enables an operator to activate or deactivate the GTD 100. The switch 125 here extends through a third window 130 in the hardened case 110. The switch 125 can be coupled to the processing circuitry or other components within the control unit 105. The switch 125 represents any suitable type of switch, such as a magnetic switch.

The GTD 100 is adapted to be removably mounted to a container or other structure. For example, the GTD 100 can include a mounting mechanism for attaching the GTD 100 to a number of different types of containers, tools, equipment, or machinery. For example, the GTD 100 can be mounted using one or more hex-head screws, socket-head cap screws, hex-head self-tapping screws, Phillips-head self tapping screws, stainless steel banding straps, zip-ties, VHB tape, and/or magnetic mountings. As a particular example, the hardened case 110 can include a number of openings 135 configured to receive screws, such as hex-head screws or socket-head cap screws. The GTD 100 can also be mounted via a standard mounting, a flush mounting, or some other mounting technique.

Figure 2:
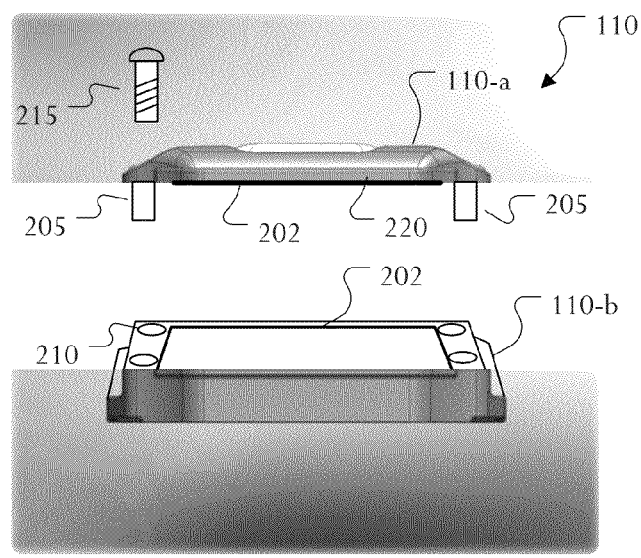
FIG. 2 illustrates an example hardened case for a global tracking device according to this disclosure.

FIG. 2 illustrates an example hardened case 110 for a global tracking device 100 according to this disclosure. As shown in FIG. 2, the hardened case 110 is configured to protect processing circuitry in the control unit 105 and a power source for the processing circuitry. In some embodiments, the hardened case 110 and the processing circuitry in the control unit 105 can be configured to have a limited lump capacitance. Also, in some embodiments, the hardened case 110 is configured to be certified for powered devices operating within explosive environments. Example certifications could include European ATEX and/or International Electrotechnical (IEC-WO029-0).

In the example shown in FIG. 2, the hardened case 110 has a modular construction. The hardened case 110 here includes a top portion 110-a and a bottom portion 110-b. When coupled together, the top portion 110-a and the bottom portion 110-b are configured to form a water-tight seal around the control unit 105. For example, the top portion 110-a and the bottom portion 110-b can include interlaced gaskets 202 each having multiple ridges configured to interlace with each other to form the water-tight seal. The gaskets 202 can include any suitable material(s) for forming a seal. The gaskets 202 could, for instance, be formed of a fluorosilicone material or other material(s) resistant to and providing a water-tight seal across a wide temperature range, such as from a low temperature of −40° C. to a high temperature of 85° C. The gaskets 202 can further be configured to absorb changes in section of metal or plastic.

In this example, the top portion 110-a also includes multiple support dowels 205, and the bottom portion 110-b also includes multiple vias 210. Each via 210 is adapted to receive and couple with a respective support dowel 205. Each via 210 can also include a threaded opening adapted to receive a connector, such as a hex bolt or other bolt 215. A bolt 215 can be inserted through an opening in one of the dowels 205 and coupled with the threaded opening in the via 210. Accordingly, the bolt 215 secures the top portion 110-a to the bottom portion 110-b. In some embodiments, the opening in one or more support dowels 205 is threaded. The support dowels 205 and vias 210 are configured to form an interlocking structure that protects against a shear load applied to the hardened case 110.

The hardened case 110 further includes reinforcement ridges 220 (also seen in FIG. 1). The reinforcement ridges 220 protrude from at least two sides of the hardened case 110. The reinforcement ridges 220 provide load bearing reinforcement to the hardened case 110. In some embodiments, the top portion 110-a includes one part of each reinforcement ridge 220, and the bottom portion 110-b includes another part of each reinforcement ridge 220. In other embodiments, either the top portion 110-a or the bottom portion 110-b includes each reinforcement ridge 220.

Different hardened cases 110 can be dimensioned to have different sizes depending upon specified applications. In some embodiments, one example of a hardened case 110 is dimensioned to be 3.1 inches wide, 6.25 inches long, and 1.41 inches high.

Figure 3:
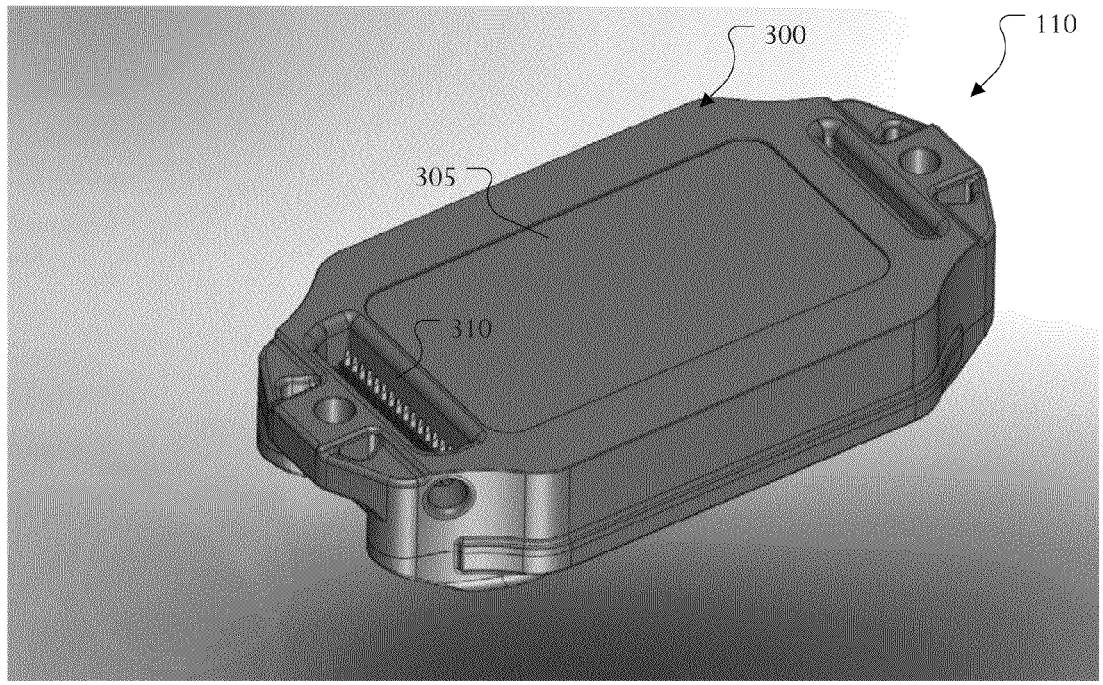
FIG. 3 illustrates an example bottom view of the hardened case according to this disclosure.

FIG. 3 illustrates an example bottom view of the hardened case 110 according to this disclosure. As shown in FIG. 3, the hardened case 110 includes a substantially flat mounting surface 300 (its bottom surface here). In some embodiments, the mounting surface 300 is flat and includes no protrusions or recesses. In other embodiments like the one shown here, the mounting surface 300 includes a recess 305. The recess 305 can be adapted, for example, to receive a mounting mechanism, such as a tape or magnetized source. The mounting surface 300 also includes a fourth window 310, which provides an access point to the control unit 105. For example, the fourth window 310 can be used to upgrade or connect to the control unit 105. The fourth window 310 includes one or more seals for inhibiting the leakage of liquids into the hardened case 110. Note that use of the fourth window 310 can be optional.

Figure 4:
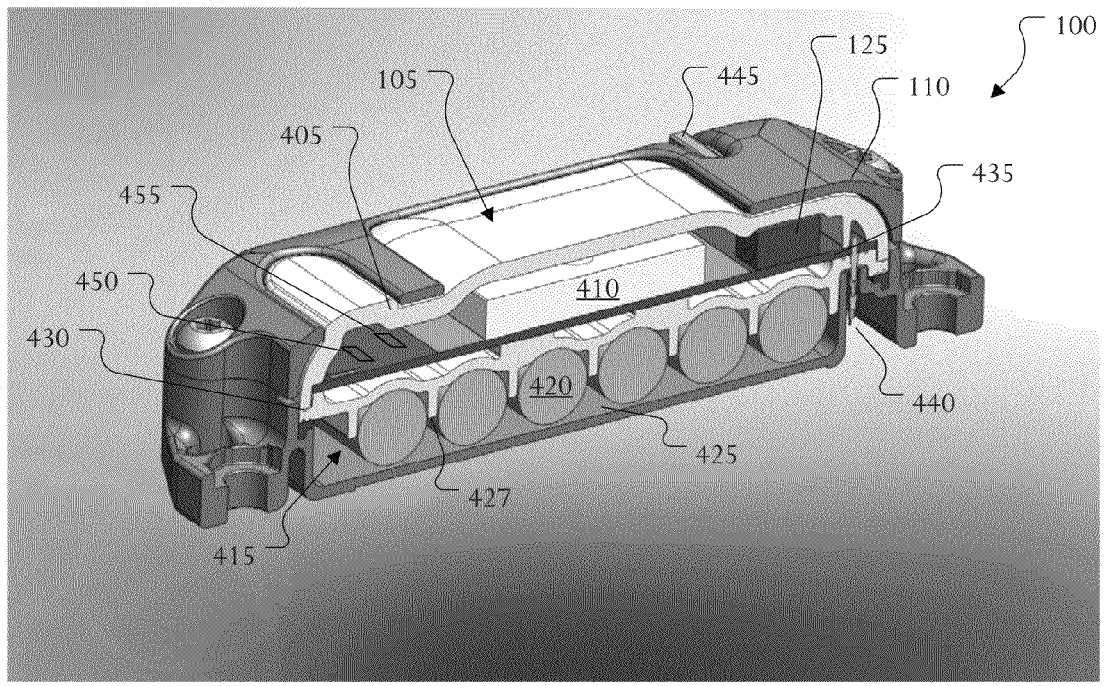
FIG. 4 illustrates an example cross-sectional view of the global tracking device according to this disclosure.

FIG. 4 illustrates an example cross-sectional view of the global tracking device 100 according to this disclosure. As shown in FIG. 4, the GTD 100 includes the control unit 105 protected by the hardened case 110. The control unit 105 here includes a plastic or other encasement 405. The encasement 405 can be molded to conform to an internal shape of the hardened case 110. In some embodiments, the encasement 405 is configured to form a water-tight seal with the internal surfaces of the hardened case 110. The encasement 405 can be a self-contained, sealed compartment that houses processing circuitry 410 and other components of the control unit 105. Accordingly, the combination of the hardened case 110 and the encasement 405 provides two layers of water-tight seals for the GTD 100. In some embodiments, portions of the encasement 405 are configured to extend through one or more windows 115, 120, 130 of the hardened case 110.

The GTD 100 also includes a power source 415, which supplies operating power for the GTD 100. Any suitable power source could be used, such as multiple batteries 420 coupled in series or in parallel. In some embodiments, the power source 415 can include a power converter configured to convert power from an external source for use by the processing circuitry 410 or other components. For example, the power source 415 can include a solar cell converter configured to convert or otherwise redirect electrical power generated by a solar cell into power configured to re-charge the batteries 420 and/or provide power to the processing circuitry 410.

In this example, the batteries 420 are contained within a battery compartment 425. The battery compartment 425 can be formed by a cavity created between the encasement 405 and the bottom portion 110-b of the hardened case 110. For example, the battery compartment 425 can be disposed in a region beneath or otherwise adjacent to a location of the processing circuitry 410 within the encasement 405. The encasement 405 can include a plurality of ribs 427 that are configured to define individual battery seats, as well as to inhibit compression of the control unit 105. Upon opening of the hardened case 110 (such as by removing the bottom portion 110-b), access to the batteries 420 within the battery compartment 425 can be obtained. Accordingly, one or more batteries 420 can be easily replaced by opening the hardened case 110.

The hardened case 110 further includes one or more seals 430 where different portions of the encasement 405 meet. Among other things, these seals 430 help to seal the battery compartment 425. This can also help to seal battery contacts electrically connecting the processing circuitry 410 to the batteries 420 in order to protect against liquids penetrating the control unit 105.

The processing circuitry 410 here is mounted on a circuit board 435, which is contained within the encasement 405. The circuit board 435 in this example includes an external electrical connection 440. The external electrical connection 440 is electrically coupled to the processing circuitry 410 through one or more connections on the circuit board 435. The external electrical connection 440 is also configured to extend through the fourth window 310. The external electrical connection 440 can be used in various ways, such as to communicate with or power the processing circuitry 410 or to couple to an external device. The junction of the external electrical connection 440 and the encasement 405 is configured to maintain the water-tight seal of the encasement 405. That is, the encasement 405 can be in physical contact with or otherwise molded to the external electrical connection 440 so that liquids cannot enter into the encasement 405 at the junction between the encasement 405 and external electrical connection 440.

The processing circuitry 410 is coupled to the switch 125 through one or more connections on the circuit board 435. The switch 125 can be configured, for example, to toggle the processing circuitry 410 from an on state to an off state and vice-versa. As a particular example, the switch 125 can be configured to interrupt or allow power from the power source 415 to be delivered to the processing circuitry 410. A portion 445 of the switch 125 extends through the third window 130 of the hardened case 110.

In addition, the GTD 100 includes transceivers 450-455 configured to communicate through one or more of the windows 115-120. As noted above, the transceivers 450-455 could support any suitable wireless communication protocol(s). For example, the transceiver 450 could represent a BLE transceiver disposed in proximity to the second window 120, and the transceiver 455 could represent an RFID transceiver also disposed in proximity to the second window 120.

FIG. 5 illustrates an example circuit board 435 in the global tracking device 100 according to this disclosure. As shown in FIG. 5, circuitry is disposed on both sides of the circuit board 435. The circuitry here includes a controller 505 and a long-distance transceiver 510. The transceiver 510 can include an antenna coupled to a modem 512, such as a satellite modem, cellular modem, or other suitable wireless communications modem.

The circuitry also includes a global positioning system (GPS) engine 515, a BLE engine 520, and an RF identifier 525. The RF identifier 525 could be an embedded passive global RFID device. The circuit board 435 further includes various conductive tracings configured to communicatively couple the controller 505 to the transmitter 510, the GPS engine 515, the BLE engine 520 and the RF identifier 525. An expansion header 530 can be coupled to one or more elements on the circuit board 435 through the conductive tracings to provide a connection point for access to the components on the circuit board 435 or for future access. For example, the expansion header 530 can be configured to provide a future use capability for communicating with or powering of the processing circuitry 510 or for coupling to an external device via the external electrical connection 440.

The controller 505 is coupled to a memory 535. The memory 535 is configured to store instructions and data used, generated, or collected by the controller 505. The controller 505 is configured to control the functions of the GTD 100. For example, the controller 505 can be configured to control wireless communications sent and received by the transceiver 510 or the BLE engine 520.

In this example, the circuit board 435 further includes multiple sensors. The sensors can include a shock sensor 540, an accelerometer 545, a temperature sensor 550, and a three-dimensional (3D) impact sensor 555. The controller 505 can use the sensors 540-555 in any suitable manner. For example, the controller 505 could use the sensors to determine if the object to which the GTD 100 is attached has been dropped or damaged. Accordingly, the GTD 100 can be configured to initiate event-based maintenance. For instance, the GTD 100 can trigger an alarm indicating that the object to which the GTD 100 is attached may require maintenance due to an impact occurring over a threshold amount, such as an impact three times the force of gravity (3G) in any direction. Moreover, the GTD 100 can store information related to the impact, such as by storing and providing information related to the shock in x-y-z vectors. Additionally, the controller 505 can be configured to differentiate between impact, motion, and machine vibration (such as vibration from normal operation). The controller 505 can combine information regarding motion and vibration to detect impact and differentiate impact from normal operation. The GTD 100 also can be configured to measure an internal temperature of the GTD 100.

The controller 505 may represent a single processing device, a multi-processing unit, or a distributed processing system. The controller 505 can utilize instructions stored in the memory 535 and connections to various other components, such as various transceivers, sensors, or batteries.

During operation, the controller 505 can store data related to the object to which the GTD 100 is attached in the memory 535. The controller 505 can therefore be configured to perform data logging, such as downloading high-resolution data locally. Additionally, the controller 505 can alter the timing of a report based on motion of the GTD 100, such as movement of the object to which the GTD 100 is attached. The GTD 100 can also store information related to vibration of the object to which the GTD 100 is attached. Accumulated vibration information can include data related to year-to-date, lifetime, and instant operation (this trip) vibrations. The GTD 100 can further measure the vibrations using the sensors and embed vibration information in messages reported to an operator or central facility. In some embodiments, the GTD 100 includes a vibration detection read switch configured to enable an operator to read vibration information via an external device.

The memory 535 may include any suitable volatile and/or non-volatile storage and retrieval device(s). For example, the memory 535 can include any electronic, magnetic, electromagnetic, optical, electro-optical, electro-mechanical, and/or other physical device(s) that can contain, store, communicate, propagate, or transmit information. The memory 535 can store data and instructions for use by the controller 505. Additionally, the memory 535 can store information related to the object to which the GTD 100 is attached, such as detected location, event history, maintenance history, emergency handling procedures, and so forth.

External devices and users can interact with the GTD 100 in any suitable manner. For example, the GTD 100 could communicate with a monitor, keyboard, mouse, or other input/output device. The GTD 100 could also communicate wirelessly with other devices or systems.

FIG. 6 illustrates an example signal focusing configuration 600 of the global tracking device 100 according to this disclosure. As shown in FIG. 6, one or more long-range RF signals are focused into the transceiver 510 using this signal focusing configuration.

The signal focusing configuration 600 defines a relationship between a location of the transceiver 510 and edges of the hardened case 110. More specifically, the transceiver 510 is disposed at a location corresponding to the first window 115. For example, the transceiver 510 can be disposed at a location on the circuit board 435 that is centered beneath the first window 115. The transceiver 510 is also disposed such that an angle formed by an adjacent edge of the first window 115, the transceiver 510, and the circuit board 435 focuses RF energy towards the transceiver 510. In some embodiments, the angle formed by an adjacent edge of the first window 115, the transceiver 510, and the circuit board 435 is about 28°. The hardened case 110 therefore focuses RF energy towards the transceiver 510. The exact position of the transceiver 510 may vary as long as the relationship between the transceiver 510 and edges of the first window 115 is maintained.

Figure 7:
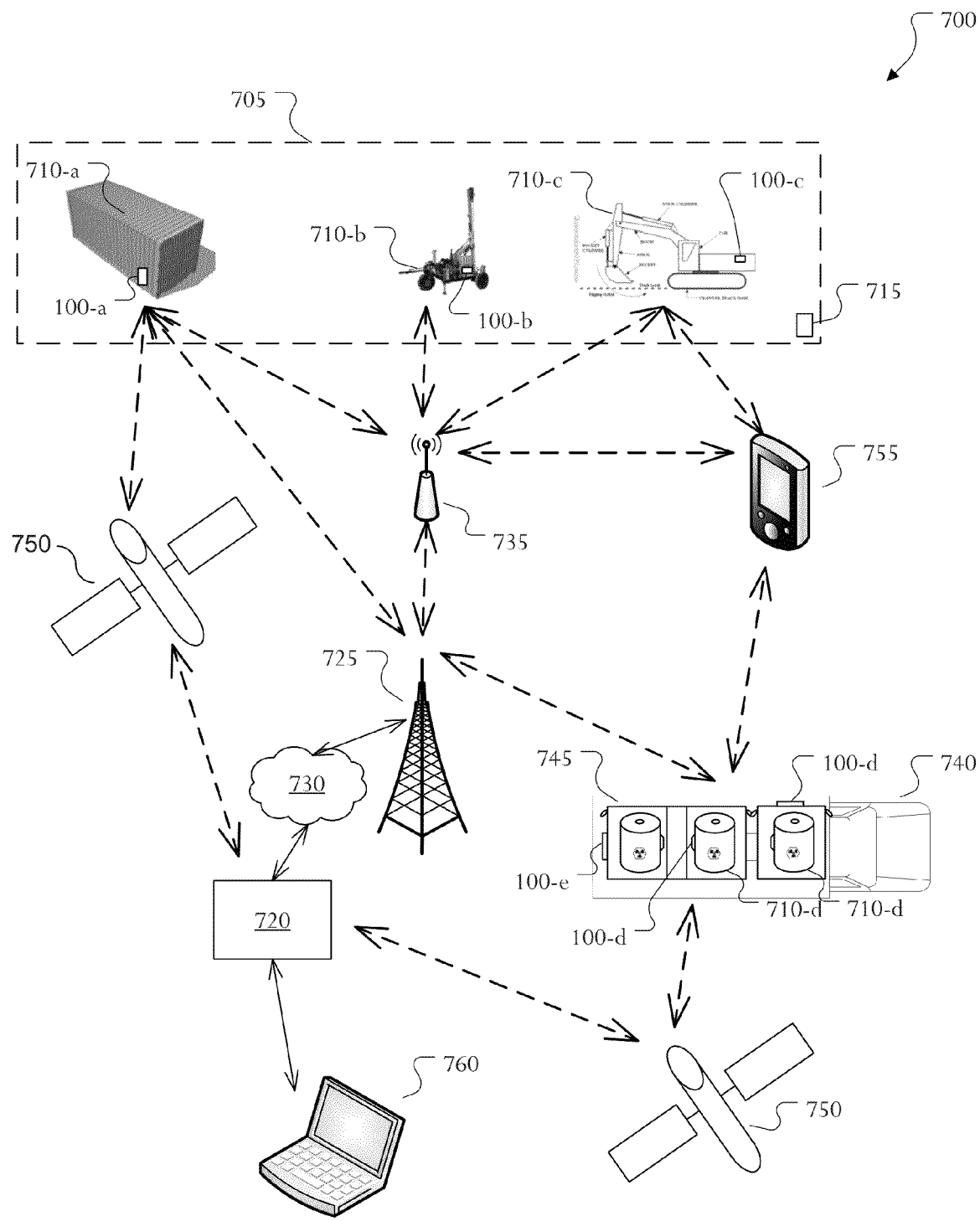
FIG. 7 illustrates an example global tracking and reporting system according to this disclosure.

FIG. 7 illustrates an example global tracking and reporting system 700 according to this disclosure. As shown in FIG. 7, an operation site 705 includes multiple pieces of equipment 710, such as storage containers 710-a, machinery 710-b, and construction equipment 710-c. The operation site 705 can represent any suitable location, such as an excavation site, a drilling site, an industrial facility, a manufacturing site, or the like. The operation site 705 can include any number of pieces of equipment.

Each piece of equipment here includes, is attached to, or is otherwise associated with a GTD 100. For example, a container 710-a is associated with a first GTD 100-a attached to a sidewall, either internally or externally. Among other things, the first GTD 100-a could store information about the container 710-a and one or more articles contained within the container 710-a. Additionally, the machinery 710-b and the construction equipment 710-c are associated with a second GTD 100-b and a third GTD 100-c, respectively. Each of these GTDs 100-b and 100-c can store information regarding the respective item to which it is attached.

The operation site 705 can optionally include a transponder 715, such as an RFID transponder. The transponder 715 can be configured to transmit a location identifier (ID), read an identifier from an RFID transmitter, or both. The location identifier can include information regarding the operation site 705. For example, the GTD 100-a attached to the container 710-a can receive a location identifier from the transponder 715 as the GTD 100-a enters into communication proximity with the transponder 715. This could occur, for instance, when a transport truck delivers the container 710-a to the operation site 705 and the transponder 715 transmits the location identifier to the GTD 100-a. This could support local functions within the operation site 705, such as when the operation site 705 supports local RFID tracking. Note, however, that the transponder 715 could be omitted in favor of the on-board location identification functionality of the GTDs.

The GTD 100-a can transmit messages to a central facility 720. A message can include an identifier for that GTD and a location of that GTD. A message can also include an object identifier identifying the object to which the GTD is attached. In some embodiments, a message further includes information regarding the contents of a container or other equipment 710. For example, the message may indicate that a specified container 710-a is located at a specified location and contains specified equipment and material. If the GTD 100 is configured to do so, the message can also include an identifier uniquely associated with the contents of the container 710-a. In some embodiments, when the contents include a radioactive or other hazardous source, the message can include a reading from a radiation sensor or other sensor (in either the container 710-a or operation site 705).

The GTDs 100-b and 100-c can also transmit messages to the central facility 720 about their associated machinery 710-b and construction equipment 710-c. Additionally, if a GTD is so configured, a message can include an identifier of other co-located GTD-enabled objects nearby.

In some embodiments, messages from the GTDs to the central facility 720 are transmitted using wireless cellular communications via one or more base stations 725 to the central facility 720. A base station 725 can be configured to transmit the messages to the central facility 720 via wireless communications or via a backhaul connection 730.

In other embodiments, messages can also be transmitted to one or more relay stations 735. A relay station 735 may be located at a regional office with a transceiver, or the relay station may be a standalone transceiver with appropriate logic necessary to transmit the messages.

In yet other embodiments, a vehicle 740 can transport equipment or materials, such as in one or more containers 710-d. The vehicle 740 could represent a truck, railcar, ship, plane, or other vehicle. The containers 710-d on the vehicle 740 are housed in an overpack 745, such as when the containers 710-d contain a radioactive material. The containers 710-d include a number of articles with corresponding information, such as IDs, stored in the memory of the attached GTDs 100-d. In some embodiments, the GTDs 100-d on the containers 710-*d* transmit messages to the central facility 720 via one or more satellites 750. The overpack 745 can also transmit an overpack message, which includes information received from the GTDs 100-*d* attached to the containers 710-*d*, to the central facility 720 via the satellite(s) 750 using its own GTD 100-*e*. A transceiver on the vehicle 740 can further transmit messages or overpack messages to the central facility via the satellite(s) 750. Note, however, that the messages from the vehicle 740 can be sent in other ways, such as via the base station(s) 725 or relay station(s) 735.

In FIG. 7, at least one portable external device 755 is configured to communicate with various GTDs. The external device 755 can be any type of portable device adapted to transmit data to and receive data from one or more GTDs. The external device 755 could, for example, represent a cellular phone, a smartphone, a personal digital assistance, or a laptop computer.

In some embodiments, the external device 755 is adapted to query a GTD to obtain information about the object to which the GTD is attached, such as containers 710-*a* or 710-*d*, machinery 710-*b*, or construction equipment 710-*c*. The external device 755 can also be adapted to program the GTD. For example, the external device 755 can be configured to allow a user to establish a periodic interval for reporting, upload or download maintenance history and comments, and upload or download emergency handling procedures.

The central facility 720 is configured to receive messages and overpack messages from the GTDs and other components at multiple locations. The central facility 720 can also be adapted to track the locations of each GTD, and as such the object to which each GTD 100 is attached, in a database. The central facility 720 can further be configured to report the locations, movement, and histories of each piece of equipment via a user interface 760, such as a computer terminal or website.

In some embodiments, the central facility 720 can generate information data records regarding the locations, movement, and histories of the equipment. For example, the central facility 720 can support a website located on a global communication network (GCN) (such as the web). The website can include the information data records. Accordingly, one or multiple users can be provided access to the location, movement, and history of each piece of equipment. In some embodiments, the website includes a graphical representation of the locations of the pieces of equipment 710. Also, in some embodiments, the website is configured to allow users to interact with the graphical representations. For example, a user may be able to select an icon representing a particular piece of equipment, and in response the website displays information corresponding to the selected equipment.

In some embodiments, the central facility 720 is also configured to send email notifications to multiple users. For example, the central facility 720 can be configured to send the notifications in response to an "alert" event occurring, at periodic intervals, or both. As a particular example, if a container experiences a collision as reported by its GTD 100 and/or is moved (transported), the central facility 720 can send an email alert to a predetermined list of users informing them that the equipment is being moved and/or may be damaged.

Although various features have been shown in FIGS. 1 through 7 and described above, various changes may be made to these figures. For example, the size, shape, arrangement, and layout of components shown in FIGS. 1 through 6 are for illustration only. Each component could have any suitable size, shape, and dimensions, and multiple components could have any suitable arrangement and layout. Also, various components in FIGS. 1 through 7 could be combined, further subdivided, or omitted and additional components could be added according to particular needs. For instance, a system using GTDs could support only cellular or satellite communications. Further, each component in a device or system could be implemented using any suitable structure(s) for performing the described function(s).

As noted above, a GTD 100 can be used in a variety of environments, such as in the oil and gas industry or at excavation sites. However, certain operations in these environments involve the use of explosives. For example, perforating, pipe cutting, percussion coring, and setting packer explosives could routinely be used in the oil and gas industry.

In many instances, industry practices or government regulations have been established to prevent the surface detonation of explosives, which could cause serious injury to personnel and extensive property damage. One common practice is to require that all devices capable of RF transmissions within a specified area be switched off or otherwise rendered "RF silent" (meaning not capable of transmitting or not allowed to transmit). For example, assume explosives are being run into a well to perform some type of operation. At the surface location where the explosives are armed, all devices capable of RF transmissions within a specified radius of the arming location may need to be rendered RF silent. After the explosives are run into the well, the devices may be rendered "RF active" (turned back on or allowed to transmit). If at some future point in time the explosives are removed from the well, the devices are again rendered RF silent prior to the explosives being retrieved from the well.

Typically, personnel providing explosive services would specify a minimum radius for disarming any RF devices. The radius often encompasses equipment owned or operated by multiple companies. As shown in FIG. 7, for example, a number of GTDs are attached to different assets, and those assets can be owned or operated by many different companies. Since operation of the GTDs can include RF transmissions, the GTDs may need to be rendered RF silent during use.

In some conventional tracking devices, a magnetic insert can be physically inserted into a tracking device in order to render that tracking device RF silent. However, this approach is undesirable for several reasons. First, it requires that personnel manually locate each tracking device to be silenced. This can be time-consuming and difficult, such as in environments where equipment and other tracked assets can move. Second, it requires that personnel physically insert an object into a tracking device after the tracking device is located. Third, it may be difficult for personnel to know for sure whether all tracking devices in a given area have been located and silenced. Fourth, after RF silence is no longer needed, the personnel must then locate all of the tracking devices again to remove the magnetic inserts from the tracking devices in order to re-enable the tracking devices. Otherwise, the tracking devices would remain in their silent state. However, because the tracking devices may be used on multiple companies' equipment, personnel with one company may have little or no motivation to ensure that another company's tracking devices are re-enabled.

In accordance with this disclosure, a tracking device (such as a GTD 100) can be remotely placed into an RF silent mode. In this mode, no RF transmissions from the GTD 100 occur. In these embodiments, the control unit 105 in a GTD 100 can be configured to receive a command to become RF silent. The command could come from any suitable source. For example, the command could come from a portable external device 755 within radio distance of the GTD 100. The command could also come from the central facility 720 or other location via cellular, satellite, WiFi, or other wireless communications. The command causes the GTD 100 to enter an RF silent mode of operation for a specified time period. The time period can be programmed into the GTD 100 or contained in or identified by the command. Once the specified time period elapses, the GTD 100 can automatically exit the RF silent mode and begin transmitting again. In this way, personnel are not required to physically locate and manually place each GTD 100 into RF silent mode. Moreover, the personnel are not required to physically locate and manually re-enable each GTD 100 once RF silent mode is no longer required.

Figure 8:
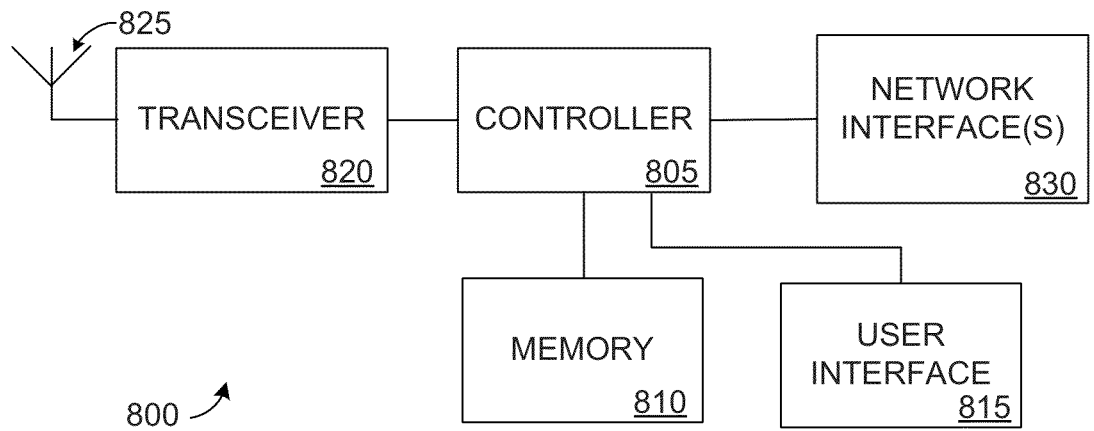
FIG. 8 illustrates an example control device for radio frequency silencing of tracking devices according to this disclosure.

FIG. 8 illustrates an example control device 800 for radio frequency silencing of tracking devices according to this disclosure. The device 800 can be used, for example, to place one or more GTDs 100 into RF silent mode. In some embodiments, the device 800 represents the portable external device 755 or a computing device in the central facility 720 of FIG. 7. In particular embodiments, the device 800 represents a smartphone or other device carried by personnel at an operation site 705 or a desktop, laptop, or other computing device used by personnel at the central facility 720. Note, however, that other embodiments of the device 800 could be used, such as when the device 800 represents a device whose sole purpose is placing GTDs 100 into RF silent mode.

As shown in FIG. 8, the device 800 includes at least one controller 805. The controller 805 generally operates to control interactions with one or more tracking devices. For example, the controller 805 could initiate identification of one or more GTDs 100 and initiate transmission of RF silence commands to those GTDs 100. The controller 805 can also perform other operations related to the device 800. When used in a smartphone, for instance, the controller 805 could support operations such as initiating or receiving telephone calls or text messages. As a particular example, the controller 805 in a smartphone could execute various "apps" or other applications, including an application for interacting with one or more GTDs 100. When used in a computing device at the central facility 720, the controller 805 could perform any of a wide variety of functions, such as by performing functions related to word processing, email, or other applications (including an application for interacting with one or more GTDs 100).

The controller 805 includes any suitable processing or computing structure configured to interact with one or more tracking devices. The controller 805 could, for example, include at least one processor, microprocessor, microcontroller, digital signal processor, field programmable gate array, application specific integrated circuit, or other processing or control device(s).

At least one memory 810 is coupled to the controller 805. The memory 810 stores instructions and data used, generated, or collected by the controller 805. For example, the memory 810 could store one or more applications used to interact with and configure or control GTDs 100. The memory 810 could also store information related to interactions with GTDs 100, such as an identification of nearby GTDs 100 or a list of GTDs 100 previously placed into RF silent mode. The memory 810 could store any other instructions or data, such as applications for performing functions unrelated to controlling GTDs 100. The memory 810 includes any suitable volatile and/or non-volatile storage and retrieval device(s).

The device 800 also includes at least one user interface 815. The user interface 815 facilitates interaction with a user. The user interface 815 includes any suitable structure(s) for providing data to or receiving data from a user. In a smartphone or other portable device, for example, the user interface 815 could include a graphical display, touchscreen, or keypad. In a larger computing device, the user interface 815 could include a graphical display, keyboard interface, or mouse interface.

The device 800 communicates with one or more tracking devices in any suitable manner. For example, the device 800 could include at least one transceiver 820 coupled to at least one antenna 825. The transceiver 820 and antenna 825 support short-range or long-range wireless communications with the GTDs 100. The transceiver 820 and antenna 825 could use any suitable protocol(s) to communicate with the GTDs 100. For example, the transceiver 820 and antenna 825 could support BLE, WiFi, ZIGBEE, or other protocols. The transceiver 820 and antenna 825 could communicate directly with GTDs 100 or indirectly, such as via one or more intermediate base stations, relay stations, access points, or other devices. The transceiver 820 includes any suitable structure for providing signals for wireless transmission and/or for obtaining signals received wirelessly. The antenna 825 represents any suitable structure for transmitting and/or receiving wireless signals.

The device 800 could also include at least one network interface 830. The network interface 830 can facilitate communications with tracking devices over at least one wired or wireless network. Example wired networks include a local area network, wide area network, or the Internet. Example wireless networks include WiFi networks, cellular networks, or satellite networks. As a particular example, the device 800 when used in the central facility 720 could communicate over a wired network, which can then provide access to a local WiFi network at the operation site 705 or to a cellular or satellite communication system. The network interface 830 includes any suitable structure for communicating over a network, such as an Ethernet interface or a wireless transceiver and antenna.

The device 800 can be used in a variety of ways to interact with and control tracking devices. For example, when used as a portable external device 755, the device 800 can locate nearby GTDs 100 at an operation site 705. This can be done in any suitable manner, such as by polling nearby GTDs 100 using BLUETOOTH signals or listening for wireless communications from nearby GTDs 100. The device 800 can also transmit RF silence commands instructing GTDs 100 to enter RF silent mode. If desired, the device 800 could then test whether the nearby GTDs 100 entered RF silent mode, such as by transmitting a message to each GTD 100 and detecting if that GTD 100 responded (in violation of the RF silent mode). Note that the device 800 need not actually identify nearby GTDs 100 and could simply broadcast an RF silence command.

When used in the central facility 720, the device 800 could locate a portable external device 755 in the field and cause that portable external device 755 to identify nearby GTDs 100. The device 800 could then cause the portable external device 755 to send RF silence commands to any identified GTDs 100. Alternatively, the device 800 could cause the portable external device 755 to broadcast RF silence commands to any nearby GTDs 100 without actually identifying those GTDs 100. The device 800 in the central facility 720 could further use WiFi, cellular, satellite, or other communications to communicate with GTDs 100 in a specified area (without requiring the use of a portable external device 755).

In this way, the device 800 can help to place one or multiple GTDs 100 or other tracking devices into RF silent mode without requiring those GTDs to be physically located and manually adjusted. Moreover, the GTDs 100 can then leave RF silent mode after some predefined or user-defined period of time, allowing normal operation to resume without further user interaction.

Although FIG. 8 illustrates one example of a control device 800 for radio frequency silencing of tracking devices, various changes may be made to FIG. 8. For example, various components of the device 800 could be combined, further subdivided, or omitted and additional components could be added according to particular needs. For instance, the network interface 830 can be omitted if not needed in a portable device, or the transceiver 820 can be omitted if not needed in a desktop computing device. Also, any other suitable device could be used to initiate or control RF silent operation by one or more tracking devices. In addition, while often described as being used to silence GTDs 100, the device 800 could be used to silence any other suitable tracking devices.

Figure 10:
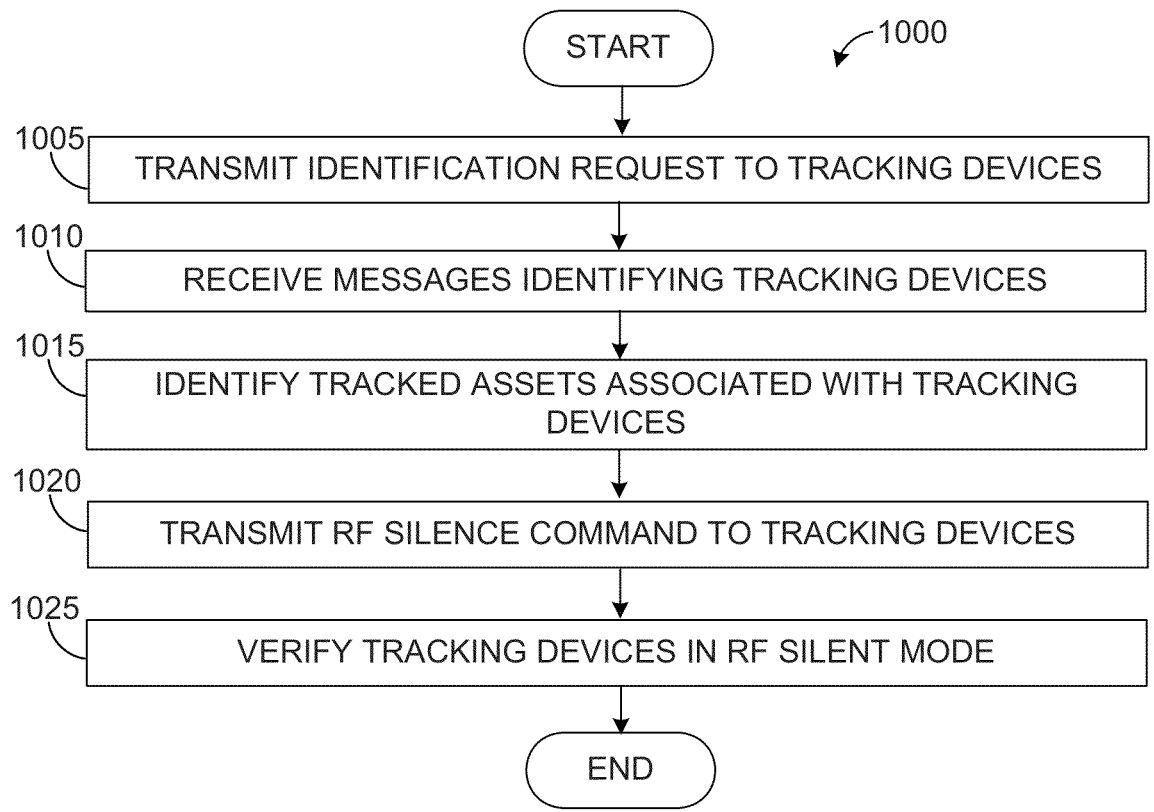
FIGS. 9 and 10 illustrate example methods for radio frequency silencing of tracking devices according to this disclosure.
Figure 9:
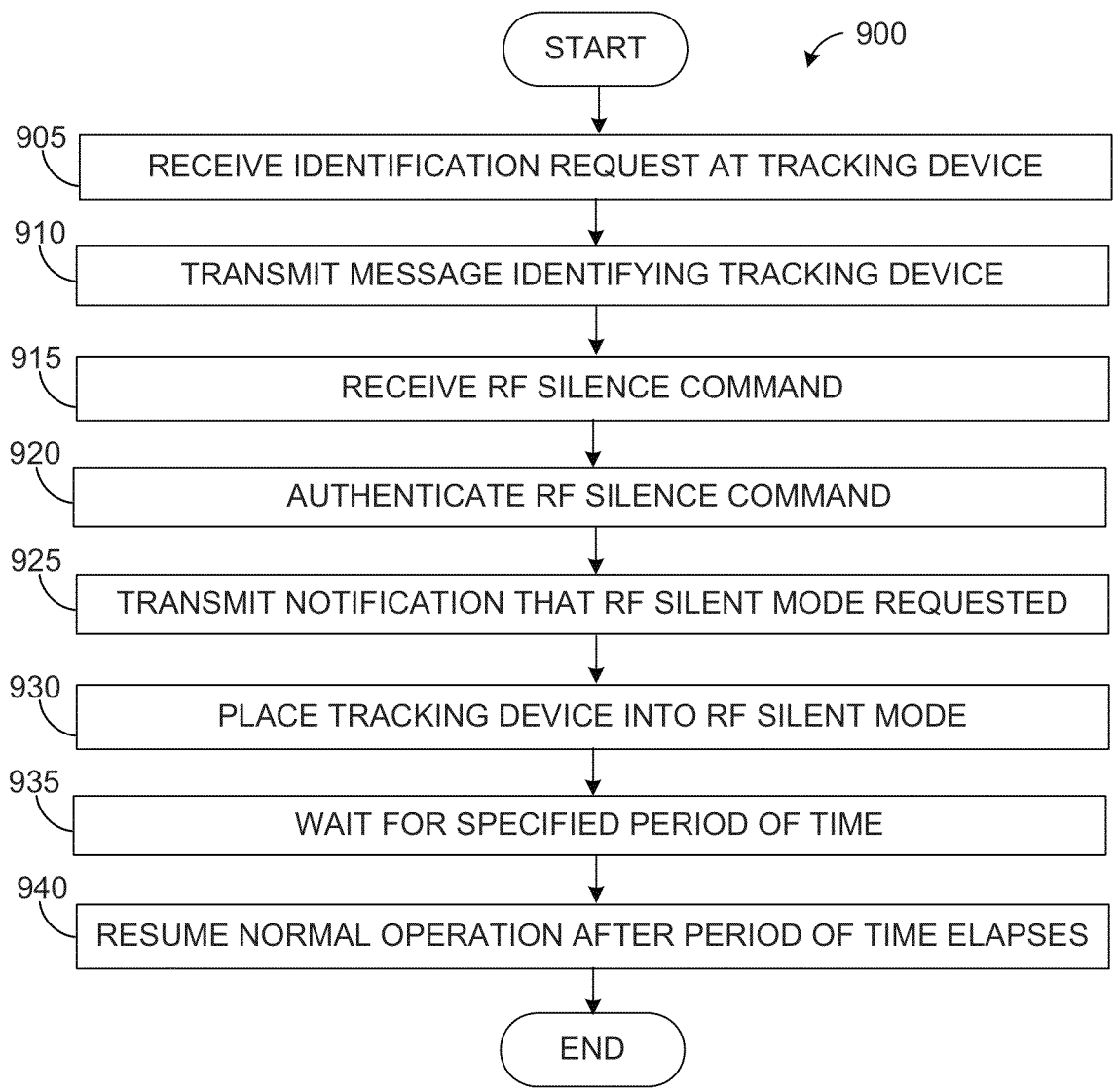

FIGS. 9 and 10 illustrate example methods for radio frequency silencing of tracking devices according to this disclosure. In particular, FIG. 9 illustrates an example method 900 performed by a GTD 100 or other tracking device, and FIG. 10 illustrates an example method 1000 performed by the device 800 or other control device.

As shown in FIG. 9, the method 900 includes receiving an identification request at a tracking device at step 905 and transmitting a message identifying the tracking device at step 910. This could include, for example, the control unit 105 receiving a request to identify its GTD 100. The request could be received using short-range or long-range wireless communications, such as from a local portable external device 755 or via a cellular, satellite, or WiFi network. The response message identifying the GTD 100 could also be sent using short-range or long-range wireless communications, such as to the portable external device 755 or to the central facility 720 via a cellular, satellite, or WiFi network. The response message could include any suitable contents, such as the device identifier of the GTD 100 and its current sensed location. In this way, the presence of the tracking device can be detected in a certain environment. Note, however, that a request-response mechanism represents only one way that a tracking device can be identified. Other techniques could also be used, such as when a device listens for wireless transmissions from the tracking device or uses last-reported geographic coordinates from the tracking device.

An RF silence command is received at step 915. The command could be received using short-range or long-range wireless communications, such as from the local portable external device 755 or via a cellular, satellite, or WiFi network. The command is authenticated at step 920. This could include, for example, verifying that the command includes or is associated with appropriate authentication information, such as a digital signature or encryption key. This could also include the control unit 105 verifying whether the received command is intended for its GTD 100. A notification that RF silent mode has been requested is transmitted at step 925. This could include, for example, the control unit 105 in the GTD 100 generating and transmitting a message indicating that the RF silence command has been received and authenticated. As a particular example, the notification could include the device identifier of the GTD 100, an identification of the user that requested RF silent mode, the current location of the GTD 100, and a timestamp related to the user or device that issued the RF silence command. This notification can be sent before the tracking device enters RF silent mode.

The tracking device is placed in RF silent mode at step 930. This could include, for example, deactivating or disabling transmit circuitry of the GTD 100. Note that the GTD 100 could be configured to continue receiving wireless transmissions while in RF silent mode. The GTD 100 could also be configured to continue performing other operations, such as shock or acceleration monitoring. Any data generated during RF silent mode (such as event notifications or logs) could be stored for later transmission.

A specified time period elapses at step 935. Any suitable length of time could be used here, such as any number of minutes, hours, days, weeks, or months. Normal operation resumes after elapse of the specified time period at step 940. This could include, for example, the control unit 105 reactivating or re-enabling the transmit circuitry of the GTD 100. At this point, data generated during RF silent mode could be transmitted, along with any new data. Note, however, that various data collected during RF silent mode could be discarded.

Note that while a tracking device is in RF silent mode at step 930, another command to enter or remain in RF silent mode could be received. This may allow, for example, the time period when the tracking device is in RF silent mode to be extended.

As shown in FIG. 10, the method 1000 includes transmitting an identification request to any tracking devices in a specified area at step 1005. This could include, for example, a portable external device 755 transmitting the identification request to any GTDs 100 in its vicinity. The portable external device 755 could do this in response to a local user's command or in response to a command received from a remote location, such as from the central facility 720. This could also include the central facility 720 broadcasting a request for all GTDs in a specified geographical area to identify themselves. Messages identifying the tracking devices are received at step 1010. The messages can identify the GTDs 100 and possibly other information, such as their geographical coordinates. Note, however, that a request-response mechanism represents one way that a tracking device can be identified. Other techniques could also be used, such as when a device listens for wireless transmissions from the tracking devices or uses last-reported geographic coordinates from the tracking devices.

One or more tracked assets are identified at step 1015. This could include, for example, identifying the assets (such as containers, tools, equipment, or machinery) associated with the identified GTDs 100. If a GTD 100 maintains the identity of its associated asset, this could be done using the information from the GTD 100. The identity of an associated asset could also be obtained from any other suitable source, such as a network-accessible database associating GTD identifiers with names and descriptions of their associated assets. The identified assets can be displayed to the user so that the user is informed about which GTDs 100 are about to go RF silent.

Assuming a user wishes to proceed, an RF silence command is transmitted to the tracking devices at step 1020. This could include, for example, the external device 755 transmitting individual messages to the identified GTDs 100 or broadcasting a single message to multiple GTDs 100. This could also include the central facility 720 initiating the transmission or broadcast of RF silence commands over a cellular, satellite, or WiFi network for specific GTDs 100. The RF silence commands can include an identification of the amount of time that RF silence is to be maintained. Verification can be made that the tracking devices are in silent mode at step 1025. This could include, for example, the external device 755 or central facility 720 attempting to communicate with each of the identified GTDs 100 and verifying that no response is transmitted or listening for RF communications.

At this point, no further action may be required. The GTDs 100 can remain in RF silent mode for a specified period of time, and the GTDs 100 can exit RF silent mode after that time. Users may not be required to perform any other actions to restore RF communications from the GTDs 100. Personnel may be well motivated to ensure that all RF communications stop when needed, such as when explosives are being used. The personnel may not be required to manually reactivate the GTDs 100 later, which may not be of high priority to the personnel (such as when the GTDs 100 are on equipment owned by a different company).

Although FIGS. 9 and 10 illustrate examples of methods for radio frequency silencing of tracking devices, various changes may be made to FIGS. 9 and 10. For example, various steps in the figures could be omitted, such as when passive listening is used to identify local tracking devices or verify whether RF silent mode has been invoked. Also, while shown as a series of steps, the steps in each figure could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving a silence command at a location tracking device, the silence command instructing the location tracking device to stop all wireless transmissions;
stopping all wireless transmissions from the location tracking device for a specified period of time in response to the silence command;
determining at the location tracking device that the specified period of time has elapsed;
automatically resuming wireless transmissions from the location tracking device in response to the determination that the specified period of time has elapsed;
receiving a second silence command before the specified period of time has elapsed; and
extending the specified period of time in response to the second silence command,
wherein a length of the specified period of time is identified by the location tracking device prior to the specified period of time elapsing.

2. The method of claim 1, wherein the length of the specified period of time is defined by the silence command.

3. The method of claim 1, further comprising:
receiving a request to identify the location tracking device at the location tracking device; and
transmitting a response identifying the location tracking device.

4. The method of claim 3, wherein the response identifying the location tracking device is transmitted prior to receiving the silence command.

5. The method of claim 1, further comprising:
transmitting a notification indicating that the silence command has been received prior to stopping all wireless transmissions.

6. The method of claim 5, wherein the notification includes an identity of the location tracking device, an identity of a user or device that issued the silence command, a location of the location tracking device, and a timestamp.

7. The method of claim 1, wherein receiving the silence command comprises receiving the silence command over one of: a cellular communication network, a satellite communication network, and a WiFi communication network.

8. The method of claim 1, wherein the specified period of time is one of: a predefined or user-defined time period programmed into the location tracking device, a predefined or user-defined time period contained in the silence command, and a predefined or user-defined time period identified by the silence command.

9. The method of claim 1, further comprising:
during the specified period of time, receiving at the location tracking device an incoming communication attempting to elicit a response from the location tracking device; and
refraining from transmitting the response from the location tracking device to thereby verify that the location tracking device is operating in a silent mode.

10. An apparatus comprising:
a location tracking device configured to be associated with an asset, the location tracking device configured to track a location of the location tracking device to thereby track a location of the asset, the location tracking device comprising:
at least one wireless transceiver configured to communicate wirelessly; and
a control unit configured to:
receive via the at least one wireless transceiver a silence command instructing the location tracking device to stop all wireless transmissions;
stop all wireless transmissions from the at least one wireless transceiver for a specified period of time in response to the silence command;
determine that the specified period of time has elapsed;
automatically resume wireless transmissions by the at least one wireless transceiver in response to the determination that the specified period of time has elapsed;
receive a second silence command before the specified period of time has elapsed; and
extend the specified period of time in response to the second silence command,
wherein the control unit is configured to identify a length of the specified period of time prior to the specified period of time elapsing.

11. The apparatus of claim 10, wherein the control unit is configured to identify the length of the specified period of time using the silence command.

12. The apparatus of claim 10, wherein the control unit is further configured to:
receive a request to identify the location tracking device via the at least one wireless transceiver; and
initiate transmission of a response identifying the location tracking device via the at least one wireless transceiver.

13. The apparatus of claim 10, wherein the control unit is further configured to initiate transmission of a notification indicating that the silence command has been received prior to stopping all wireless transmissions.

14. The apparatus of claim 13, wherein the notification includes an identity of the location tracking device, an identity of a user or device that issued the silence command, the location of the location tracking device, and a timestamp.

15. The apparatus of claim 10, wherein the location tracking device further comprises:
   a global positioning system (GPS) engine configured to identify the location of the location tracking device.

16. The apparatus of claim 10, wherein the at least one wireless transceiver comprises:
   at least one shorter-range transceiver comprising one or more of: a BLUETOOTH Low Energy transceiver, a WiFi transceiver, a ZIGBEE transceiver, and a Radio Frequency identification (RFID) transceiver; and
   at least one longer-range transceiver comprising one or more of: a cellular network transceiver and a satellite network transceiver.

17. A method comprising:
   identifying one or more location tracking devices in a specified area by:
      initiating broadcasting of an identification request, and
      receiving one or more responses from the one or more location tracking devices, the one or more responses identifying the one or more location tracking devices;
   initiating transmission of a silence command to the one or more location tracking devices, the silence command instructing the one or more location tracking devices to stop all wireless transmissions for a specified period of time before automatically resuming wireless transmissions, the silence command identifying a length of the specified period of time; and
   initiating transmission of a second silence command to the one or more location tracking devices, the second silence command instructing the one or more location tracking devices to extend the specified period of time to stop all wireless transmissions.

18. The method of claim 17, further comprising:
   identifying one or more assets associated with the one or more identified location tracking devices; and
   initiating presentation of information associated with the one or more assets to a user.

19. The method of claim 17, wherein a portable device identifies the one or more location tracking devices and transmits the silence command to the one or more location tracking devices.

20. The method of claim 19, wherein the portable device comprises a mobile smartphone.

21. The method of claim 17, wherein a computing device remote from the one or more location tracking devices identifies the one or more location tracking devices using a portable device in radio range of the one or more location tracking devices and causes the portable device to transmit the silence command.

22. The method of claim 17, wherein the initiating the transmission of the second silence command occurs before the specified period of time has elapsed.

23. The method of claim 17, wherein initiating transmission of the silence command comprises initiating transmission of the silence command over one of: a cellular communication network, a satellite communication network, and a WiFi communication network.

24. A method comprising:
   receiving a silence command at a location tracking device, the silence command instructing the location tracking device to stop all wireless transmissions;
   stopping all wireless transmissions from the location tracking device for a specified period of time in response to the silence command;
   before the specified period of time has elapsed, receiving a second silence command;
   extending the specified period of time in response to the second silence command;
   determining at the location tracking device that the specified period of time has elapsed; and
   automatically resuming wireless transmissions from the location tracking device in response to the determination that the specified period of time has elapsed;
   wherein a length of the specified period of time is identified by the location tracking device prior to the specified period of time elapsing.

* * * * *